Feb. 27, 1940.     C. B. SPANGENBERG     2,191,966
CONTROL MECHANISM FOR REFRIGERATING APPARATUS
Filed Sept. 16, 1936
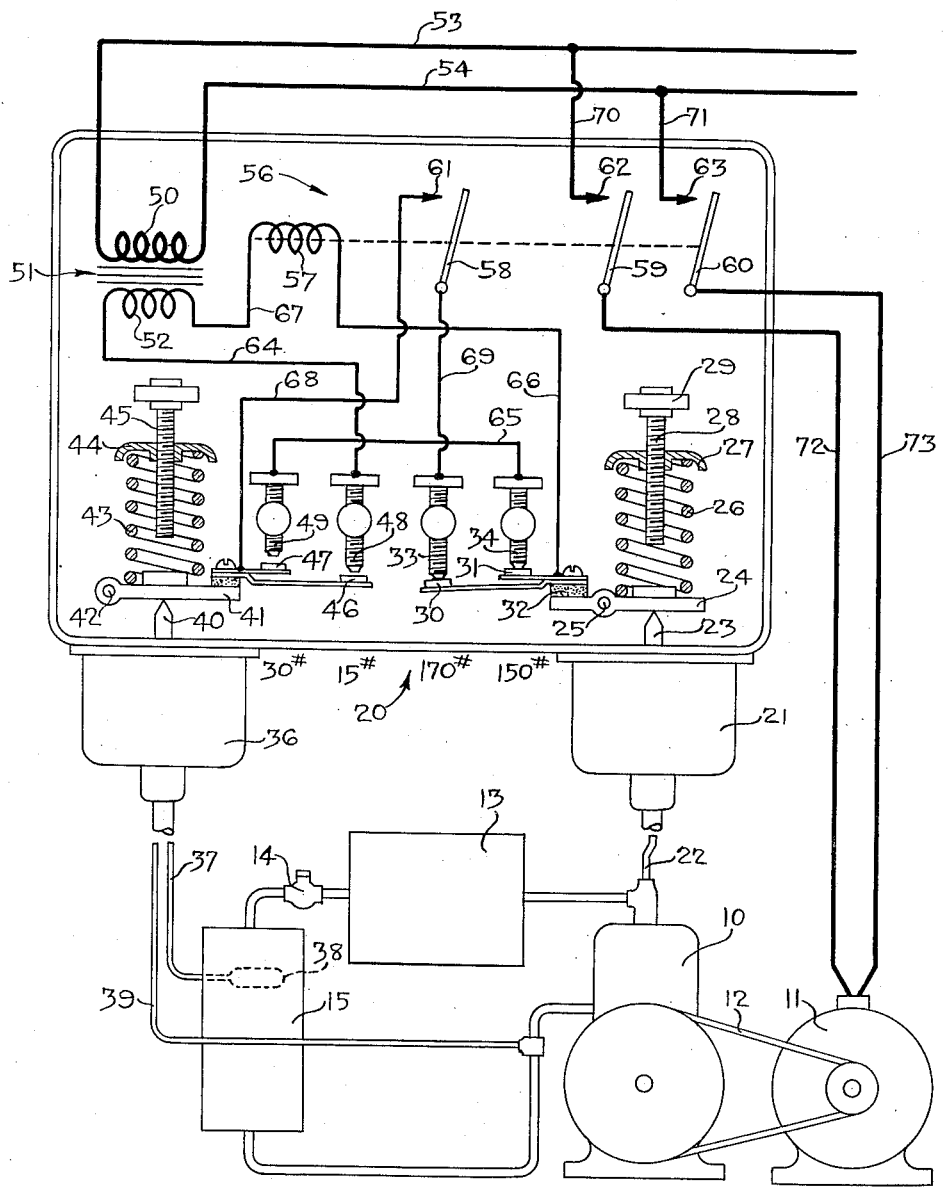
Inventor
Charles B. Spangenberg
By George H Fisher
Attorney Patented Feb. 27, 1940

2,191,966

UNITED STATES PATENT OFFICE 2,191,966

CONTROL MECHANISM FOR REFRIGERATING APPARATUS

Charles B. Spangenberg, Minneapolis, Minn., assignor to Minneapolis-Honeywell Regulator Company, Minneapolis, Minn., a corporation of Delaware Application September 16, 1936, Serial No. 101,099

18 Claims. (Cl. 62—4)

This invention relates to a control mechanism for a refrigerating apparatus. By reason of the control mechanism of this invention, the refrigerating apparatus is caused to operate in accordance with changes in a condition such as changes in suction pressure or changes in evaporator temperature. The upper limit of the range of changes in the condition may be adjusted and, likewise, the lower limit of the range may be independently adjusted so that an extremely flexible control mechanism is provided. By adjusting the upper limit of the range of changes in the condition sufficiently high, the refrigerating apparatus may be made to defrost during each cycle of operation. Also, the control mechanism responds to changes in pressure on the high pressure side of the refrigerating apparatus to prevent starting of the refrigerating apparatus when the pressure increases to a predetermined value and also to prevent continued operation of the refrigerating apparatus when the pressure increases to a predetermined higher value.

In carrying out my invention I utilize a relay for controlling the operation of the refrigerating apparatus, a pair of sequentially operated switches controlled by the suction pressure or the evaporator temperature and a pair of sequentially operated switches controlled by changes in pressure on the high pressure side of the refrigerating apparatus, all of the switches and the relay being preferably enclosed within a single housing whereby a compact arrangement is provided.

The manner, structure and combination of elements by which the above mode of operation is accomplished form objects of this invention.

For a more thorough understanding of this invention, reference is made to the accompanying specification, claims and single sheet of drawing in which drawing is diagrammatically illustrated the preferred form of my invention.

The refrigerating apparatus is shown to comprise a compressor 10, operated by an electric motor 11 through a belt 12, a condenser 13, an expansion valve 14 and an evaporator 15, all connected together in a manner well known in the art.

The refrigerating apparatus is controlled by means of a control mechanism generally designated at 20. The control mechanism includes a pressure bellows located in a bellows casing 21 which is connected by a pipe 22 to the high pressure side of the refrigerating apparatus. The bellows within the bellows casing 21 operates a plunger 23 which in turn engages a lever 24 pivoted at 25. Upon an increase in pressure on the high pressure side of the refrigerating apparatus, the plunger 23 is forced upwardly against the action of a compression spring 26 to rotate the lever 24 in a counter-clockwise direction about its pivot 25. Upon a decrease in pressure on the high pressure side of the refrigerating apparatus, the spring 26 rotates the lever 24 in a clockwise direction. The spring 26 is made adjustable by a spring container 27 screw threaded on a screw 28 rigidly mounted on a bracket 29 carried by the housing of the control mechanism 20. Rotation of the spring container 27 causes it to be moved upwardly or downwardly to vary the tension in the compression spring 26 and thereby vary the control point of this portion of the control mechanism. Suitably mounted on the lever 24 are movable contacts 30 and 31 and these contacts 30 and 31 are insulated from lever 24 by means of an insulating pad 32. The movable contacts 30 and 31 are adapted to sequentially engage stationary contacts 33 and 34 respectively. The arrangement is such that upon an increase in pressure on the high pressure side of the refrigerating apparatus, engagement between contacts 31 and 34 is first broken and then engagement between contacts 30 and 33 is broken. Upon a decrease in pressure, contact 30 first engages contact 33 and contact 31 then engages contact 34. The stationary contacts 33 and 34 are adjustable to vary the points at which these contacts make and break with their respective contacts 30 and 31.

The control mechanism is also provided with a pressure bellows enclosed within a bellows casing 36 which may be connected either by a capilliary tube 37 to a bulb 38, including a volatile fill, in close proximity to the evaporator 15 or by a pipe 39 to the low pressure side of the refrigerating apparatus. Since the suction pressure is an indication of evaporator temperature both types of control operate in substantially the same manner. The bellows within the bellows casing 36 operates a plunger 40 which in turn operates a lever 41 pivoted at 42. A spring 43 anchored by a spring container 44 mounted on a screw 45, which in turn is suitably secured to a bracket, urges the lever 41 in a clockwise direction about its pivot 42. The lever 41 operates movable contacts 46 and 47, which are suitably insulated from lever 41 by an insulating pad, with respect to stationary contacts 48 and 49, respectively. The arrangement is such that upon an increase in evaporator temperature or upon an increase in suction pressure, the contact 46 is first moved into engagement with the contact 48 and upon a further increase in either of these conditions, the contact 47 is moved into engagement with contact 49. Upon a decrease in either of these conditions, the contact 47 is first moved out of engagement with the contact 49 and then the contact 46 is moved out of engagement with the contact 48. The contacts 48 and 49 are adjustably mounted so that the making and breaking points of these contacts may be adjusted at will. By reason of the spring container 44 being screw threadedly mounted on the screw 45, the tension in the spring 43 and consequently the setting of this portion of the control mechanism may be adjusted.

A primary 50 of a step-down transformer 51 having a secondary 52 is connected across line wires 53 and 54 leading from some source of power (not shown). A relay, generally designated at 56, comprises a coil 57 for operating switch arms 58, 59 and 60 with respect to contacts 61, 62 and 63, the arrangement being such that when the relay coil 57 is energized the switch arms are moved into engagement with their respective contacts and when the relay coil 57 is deenergized the switch arms are moved out of engagement with their respective contacts by means of springs, gravity or other means (not shown). Preferably, the sequentially operated switches and the relay 56 are enclosed within a common housing, and if desired, the step-down transformer 51 may likewise be enclosed within this housing. This gives a compact arrangement of parts wherein all of the control devices may be centrally and conveniently located.

One end of the secondary 52 of the step-down transformer 51 is connected by a wire 64 to the stationary contact 48. The stationary contact 49 is connected by a wire 65 to the stationary contact 34. The movable contacts 30 and 31 are connected by a wire 66 to one end of the relay coil 57 and the other end thereof is connected by a wire 67 to the other end of the secondary 52. The movable contacts 46 and 47 are connected by a wire 68 to the contact 61 of the relay 56. The switch arm 58 cooperating therewith is connected by a wire 69 to the stationary contact 33.

For purposes of illustrating the mode of operation of this invention, it is assumed that the bellows casing 36 is connected to the low pressure side of the refrigerating apparatus, that the contacts 46 and 48 make and break at 15 pounds suction pressure, the contacts 47 and 49 make and break at 30 pounds suction pressure, that the contacts 30 and 33 make and break at 170 pounds high pressure and that the contacts 31 and 34 make and break at 150 pounds high pressure. Therefore, with the parts in the position shown, the suction pressure is slightly less than 15 pounds and the high pressure is less than 150 pounds. The relay 56 is, therefore, deenergized and the refrigerating apparatus is inoperative. Upon an increase in suction pressure to 15 pounds, contact 46 moves into engagement with contact 48 but no circuits are completed by this movement. When the suction pressure increases to 30 pounds, the contact 47 is moved into engagement with the contact 49 to complete a starting circuit from the secondary 52 through wire 64, contacts 48, 46, 47, and 49, wire 65, contacts 34 and 31, wire 66, relay coil 57 and wire 67 back to the secondary 52. Completion of this starting circuit causes energization of the relay coil 57 to move the switch arms 58, 59 and 60 into engagement with contacts 61, 62 and 63 respectively. Movement of the switch arms 59 and 60 into engagement with contacts 62 and 63 completes a circuit from the line wire 53 through wire 70, contact 62, switch arm 59, wire 72, compressor motor 11, wire 73, switch arm 60, contact 63, and wire 71 back to the other line wire 54. Completion of this circuit causes operation of the refrigerating apparatus which reduces the suction pressure.

Movement of the switch arm 58 into engagement with contact 61 upon energization of the relay coil 57 completes a maintaining circuit from the secondary 52 through wire 64, contacts 48 and 46, wire 68, contact 61, switch arm 58, wire 69, contacts 33 and 30, wire 66, relay coil 57 and wire 67 back to the secondary 52. Completion of this maintaining circuit maintains the relay coil 57 energized and, therefore, maintains the refrigerating apparatus in operation even though contact 47 separates from contact 49 by the decrease in suction pressure caused by the operation of the refrigerating apparatus. Therefore, the refrigerating apparatus is maintained in operation until the suction pressure decreases to 15 pounds whereupon contact 46 moves out of engagement with contact 48 to break the maintaining circuit for the relay 56. In this manner the refrigerating apparatus is placed in operation when the suction pressure rises to 30 pounds and is stopped when the suction pressure decreases to 15 pounds. By suitably adjusting the contacts 48 and 49, the points at which the refrigerating apparatus is started and stopped may be varied at will. It is, therefore, possible to adjust the contact 49 to prevent operation of the refrigerating apparatus until the suction pressure or evaporator temperature rises to such a value as to insure that the refrigerating apparatus is defrosted. In this manner defrosting of the refrigerating apparatus during each cycle of operation is provided. Likewise, the contact 48 may be adjusted to vary the lower limit of the range of suction pressures or evaporator temperatures to vary the cooling effect of the refrigerating apparatus. Both limits of the range of suction pressures may be simultaneously and substantially equally raised or lowered by manipulation of the spring container 44. It is, therefore, seen that by reason of these various adjustments, the control mechanism is extremely flexible and can perform any desired mode of operation.

It is seen that the starting circuit for the relay 56 passes through the contacts 31 and 34 and, therefore, the refrigerating apparatus can not be started if the pressure on the high pressure side of the refrigerating apparatus is greater than 150 pounds at which pressure the contacts 31 and 34 separate. This greatly reduces the starting torque on the compressor motor and accordingly smaller compressor motors may be utilized. It is also seen that the maintaining circuit for the relay 56 passes through contacts 30 and 33 and, therefore, it is impossible to maintain the refrigerating apparatus in operation when the pressure on the high pressure side of the refrigerating apparatus is greater than 170 pounds. By reason of this construction, it is impossible to start the refrigerating apparatus if the pressure is greater than 150 pounds but it is possible to maintain the refrigerating apparatus in operation after it has once been started even though the pressure does rise above 150 pounds. However, if the pressure should rise to 170 pounds the continued operation of the refrigerating apparatus is entirely prevented. The contacts 33 and 34 may be adjusted to vary the point at which starting of the refrigerating apparatus is prevented and the point at which continued operation of the refrigerating apparatus is prevented. By reason of these adjustments, further flexible control is provided.

Although I have disclosed one form of my invention, other forms thereof may become apparent to those skilled in the art and, consequently, this invention should be limited only by the scope of the appended claims and the prior art.

I claim as my invention:

1. A control mechanism for a mechanical refrigerating apparatus including a relay for controlling the operation of the refrigerating apparatus, a switch responsive to changes in a condition which is a measure of a temperature condition for controlling said relay, a switch responsive to changes in pressure on the high pressure side of the refrigerating apparatus for preventing control of the relay by the first switch when the pressure increases above predetermined values, and a housing enclosing the relay and the switches to form a compact control mechanism.

2. A control mechanism for a mechanical refrigerating apparatus comprising in combination, a relay for controlling the operation of the refrigerating apparatus, a switching mechanism for controlling the operation of the relay, means responsive to changes in the value of a condition which is a measure of a temperature condition for operating said switching mechanism, means for adjusting the switching mechanism to adjust independently the values of the condition at which the switching mechanism starts and stops the refrigerating apparatus, and a common support for the relay, switching mechanism, condition responsive means and adjusting means whereby all of the control elements are centrally located with respect to each other.

3. A control mechanism for a mechanical refrigerating apparatus comprising in combination, a relay for controlling the operation of the refrigerating apparatus, a first switching mechanism for controlling the operation of the relay, means responsive to changes in pressure values on the low pressure side of the refrigerating apparatus for operating said switching mechanism, means for adjusting the switching mechanism to adjust independently the pressure values at which the switching mechanism controls the relay to start and stop the refrigerating apparatus, a second switching mechanism for controlling the operation of the relay, means responsive to changes in pressure values on the high pressure side of the refrigerating apparatus for operating said second switching mechanism, means for adjusting the second switching mechanism to adjust the pressure values at which the second switching mechanism controls the relay to start and stop the refrigerating apparatus, and a common support for the relay, the switching mechanisms, the pressure responsive means and the adjusting means whereby all of the control elements are centrally located with respect to each other.

4. In a control system for a refrigerating apparatus including an evaporator and a mechanism for controlling the circulation of refrigerant through the evaporator, the combination of, first switch means movable to starting and stopping positions, second switch means movable to starting and stopping positions, means responsive to a condition which is a measure of evaporator temperature for operating the first switch means to maintain the first switch means in the starting position only when the evaporator temperature is at a defrosting value and to maintain the first switch means in the stopping position only when the evaporator temperature is at a predetermined low value, means responsive to a condition which is a measure of the pressure on the high pressure side of the refrigerating apparatus for operating the second switch means to maintain the second switch means in the starting position only when the pressure is at a predetermined low value and to maintain the second switch means in the stopping position only when the pressure is at a predetermined high value, and means controlled by both switch means for controlling the operation of the mechanism to start the circulation of the refrigerant through the evaporator only when both switch means are moved to the starting positions and to stop circulation of refrigerant through the evaporator when either switch means are moved to the stopping positions.

5. In a control system for a mechanical refrigerating apparatus having an evaporator and a compressor, the combination of, a relay for causing operation of the compressor when energized and including a maintaining switch therefor which is closed when the relay is energized, a pair of sequentially operated switches for controlling the energization of said relay, means responsive to a condition which is a measure of evaporator temperature for sequentially closing said switches as the evaporator temperature increases and for sequentially opening said switches as the evaporator temperature decreases, and connections between said sequentially operated switches, said maintaining switch and said relay to cause energization of said relay and starting of said compressor when both of the sequentially operated switches close upon increase in evaporator temperature, to continue energization of said relay and operation of said compressor while one of the sequentially operated switches remains closed upon decrease in evaporator temperature and to deenergize said relay and stop operation of the compressor when both of the sequentially operated switches open upon continued decrease in evaporator temperature.

6. In a control system for a refrigerating apparatus including an evaporator and a compressor, the combination of, a relay for causing operation of the compressor when energized and including a maintaining switch therefor which is closed when the relay is energized, first switching means, second switching means, means responsive to a condition which is a measure of evaporator temperature for closing the first switching means only when the evaporator temperature increases to a defrosting value, means responsive to a condition which is a measure of pressure on the high pressure side of the refrigerating apparatus for closing the second switching means only when the pressure decreases to a predetermined low value, means for completing a circuit through the relay and both switching means when closed to energize the relay and start the compressor, and means for completing a circuit through the relay and the maintaining switch to maintain the relay energized and the compressor in operation.

7. In a control system for a mechanical refrigerating apparatus including an evaporator for performing a cooling function and a compressor, the combination of, a relay for causing operation of the compressor when energized and including a maintaining switch therefor which is closed when the relay is energized, a first switch, means responsive to a condition which is a measure of temperature for operating the first switch to close the first switch when the condition rises to a predetermined high value, second and third switches, means responsive to a condition which is a measure of pressure on the high pressure side of the refrigerating apparatus for operating the second and third switches to close the second switch at a predetermined low pressure value and to open the third switch at a predetermined high pressure value, means for completing a circuit through the relay and the first and second switches when closed to energize the relay and start the compressor, and means for completing a circuit through the relay, the third switch and the maintaining switch to maintain the relay energized and the compressor in operation.

8. In a control system for a mechanical refrigerating apparatus including an evaporator for performing a cooling function and a compressor, the combination of, a relay for causing operation of the compressor when energized and including a maintaining switch therefor which is closed when the relay is energized, a switching mechanism, means responsive to a condition which is a measure of temperature for operating the switching mechanism in accordance with changes in the condition, first and second switches, means responsive to a condition which is a measure of pressure on the high pressure side of the refrigerating apparatus for operating the first and second switches to close the first switch at a predetermined low pressure value and to open the second switch at a predetermined high pressure value, means for completing a circuit through the relay, the switching mechanism and the first switch to energize the relay and start the compressor, and means for completing a circuit through the relay, the switching mechanism, the second switch and the maintaining switch to maintain the relay energized and the compressor in operation.

9. In a control system for a mechanical refrigerating apparatus including an evaporator for performing a cooling function and a compressor, the combination of, a relay for causing operation of the compressor when energized and including a maintaining switch therefor which is closed when the relay is energized, first and second switches, means responsive to a condition which is a measure of temperature for operating the first and second switches to close the first switch at a predetermined high value of the condition and to open the second switch at a predetermined low value of the condition, third and fourth switches, means responsive to a condition which is a measure of pressure on the high pressure side of the refrigerating apparatus for operating the third and fourth switches to close the third switch at a predetermined low pressure value and to open the fourth switch at a predetermined high pressure value, means for completing a circuit through the relay and the first and third switches to energize the relay and start the compressor, and means for completing a circuit through the relay, the second and fourth switches and the maintaining switch to maintain the relay energized and the compressor in operation.

10. In a control system for a mechanical refrigerating apparatus including a compressor, the combination of, a relay for causing operation of the compressor when energized and including a maintaining switch therefor which is closed when the relay is energized, first and second switches, means responsive to a condition which is a measure of the pressure on the high pressure side of the refrigerating apparatus for operating the first and second switches to close the first switch at a predetermined low pressure value and to open the second switch at a predetermined high pressure value, means for completing a circuit through the relay and the first switch to energize the relay and start the compressor, and means for completing a circuit through the relay, the second switch and the maintaining switch to maintain the relay energized and the compressor in operation.

11. In a control system for a mechanical refrigerating apparatus including a compressor, the combination of, a relay for causing operation of the compressor when energized and including a maintaining switch therefor which is closed when the relay is energized, first and second switches, means responsive to a condition which is a measure of the pressure on the high pressure side of the refrigerating apparatus for operating the first and second switches to close the first switch at a predetermined low pressure value and to open the second switch at a predetermined high pressure value, a third switch, means for completing a circuit through the relay and the first and third switches to energize the relay and start the compressor, and means for completing a circuit through the relay, the second switch and the maintaining switch to maintain the relay energized and the compressor in operation.

12. In a control system for a mechanical refrigerating apparatus including a compressor, the combination of, a relay for causing operation of the compressor when energized and including a maintaining switch therefor which is closed when the relay is energized, first and second switches, means responsive to a condition which is a measure of the pressure on the high pressure side of the refrigerating apparatus for operating the first and second switches to close the first switch at a predetermined low pressure value and to open the second switch at a predetermined high pressure value, a starting switch, a stopping switch, means for completing a circuit through the relay, the first switch and the starting switch to energize the relay and start the compressor, and means for completing a circuit through the relay, the second switch, the stopping switch and the maintaining switch to maintain the relay energized and the compressor in operation.

13. In a control system for a refrigerating apparatus having an evaporator and an electrically controlled mechanism for controlling the circulation of refrigerant through the evaporator, the combination of, first and second switches, means responsive to a condition which is a measure of evaporator temperature for closing the first switch when the evaporator temperature increases to a predetermined high value and for opening the second switch when the evaporator temperature decreases to a predetermined low value, means for completing a starting circuit through the first switch to operate the electrically controlled mechanism to circulate refrigerant through the evaporator, a maintaining switch, means for closing the maintaining switch as an incident to completion of the starting circuit, and means for completing a maintaining circuit through the second switch and the maintaining switch to maintain the electrically controlled mechanism in operation to maintain circulation of refrigerant through the evaporator, said maintaining switch remaining closed as long as the maintaining circuit is completed.

14. In a control system for a refrigerating apparatus having an evaporator and an electrically controlled mechanism for controlling the circulation of refrigerant through the evaporator, the combination of, a first switch, means responsive to a condition which is a measure of evaporator temperature for closing the first switch only when the evaporator temperature increases to a defrosting value, a second switch, means responsive to a condition which is a measure of pressure on the high pressure side of the refrigerating apparatus for closing the second switch only when the pressure decreases to a predetermined low value, means for completing a starting circuit through the first and second switches to operate the electrically controlled mechanism to circulate refrigerant through the evaporator, a maintaining switch, means for closing the maintaining switch as an incident to completion of the starting circuit, and means for completing a maintaining circuit through the maintaining switch to maintain the electrically controlled mechanism in operation to maintain circulation of refrigerant through the evaporator, said maintaining switch remaining closed as long as the maintaining circuit is completed.

15. In a control system for a refrigerating apparatus having an evaporator and an electrically controlled mechanism for controlling the circulation of refrigerant through the evaporator, the combination of, first and second switches, means responsive to a condition which is a measure of evaporator temperature for closing the first switch when the evaporator temperature increases to a predetermined high value and for opening the second switch when the evaporator temperature decreases to a predetermined low value, a third switch, means responsive to a condition which is a measure of pressure on the high pressure side of the refrigerating apparatus for closing the third switch when the pressure decreases to a predetermined low value, means for completing a starting circuit through the first and third switches to operate the electrically controlled mechanism to circulate refrigerant through the evaporator, a maintaining switch, means for closing the maintaining switch as an incident to completion of the starting circuit, and means for completing a maintaining circuit through the second switch and the maintaining switch to maintain the electrically controlled mechanism in operation to maintain circulation of refrigerant through the evaporator, said maintaining switch remaining closed as long as the maintaining circuit is completed.

16. In a control system for a refrigerating apparatus having an evaporator and an electrically controlled mechanism for controlling the circulation of refrigerant through the evaporator, the combination of, a first switch, means responsive to a condition which is a measure of evaporator temperature for closing the first switch when the evaporator temperature increases to a predetermined high value, second and third switches, means responsive to a condition which is a measure of pressure on the high pressure side of the refrigerating apparatus for closing the second switch when the pressure decreases to a predetermined low value and for opening the third switch when the pressure increases to a predetermined high value, means for completing a starting circuit through the first and second switches to operate the electrically controlled mechanism to circulate refrigerant through the evaporator, a maintaining switch, means for closing the maintaining switch as an incident to completion of the starting circuit, and means for completing a maintaining circuit through the third switch and the maintaining switch to maintain the electrically controlled mechanism in operation to maintain circulation of refrigerant through the evaporator, said maintaining switch remaining closed as long as the maintaining circuit is completed.

17. In a control system for a refrigerating apparatus having an evaporator and an electrically controlled mechanism for controlling the circulation of refrigerant through the evaporator, the combination of, first and second switches, means responsive to a condition which is a measure of evaporator temperature for closing the first switch when the evaporator temperature increases to a predetermined high value and for opening the second switch when the evaporator temperature decreases to a predetermined low value, third and fourth switches, means responsive to a condition which is a measure of pressure on the high pressure side of the refrigerating apparatus for closing the third switch when the pressure decreases to a predetermined low value and for opening the fourth switch when the pressure increases to a predetermined high value, means for completing a starting circuit through the first and third switches to operate the electrically controlled mechanism to circulate refrigerant through the evaporator, a maintaining switch, means for closing the maintaining switch as an incident to completion of the starting circuit, and means for completing a maintaining circuit through the second and fourth switches and the maintaining switch to maintain the electrically controlled mechanism in operation to maintain circulation of refrigerant through the evaporator, said maintaining switch remaining closed as long as the maintaining circuit is completed.

18. In a control system for a refrigerating apparatus having an evaporator and an electrically controlled mechanism for controlling the circulation of refrigerant through the evaporator, the combination of, first and second switches, means responsive to a condition which is a measure of pressure on the high pressure side of the refrigerating apparatus for closing the first switch when the pressure decreases to a predetermined low value and for opening the second switch when the pressure increases to a predetermined high value, means for completing a starting circuit through the first switch to operate the electrically controlled mechanism to circulate refrigerant through the evaporator, a maintaining switch, means for closing the maintaining switch as an incident to completion of the starting circuit, and means for completing a maintaining circuit through the second switch and the maintaining switch to maintain the electrically controlled mechanism in operation to maintain circulation of refrigerant through the evaporator, said maintaining switch remaining closed as long as the maintaining circuit is completed.

CHARLES B. SPANGENBERG.